UNITED STATES PATENT OFFICE.

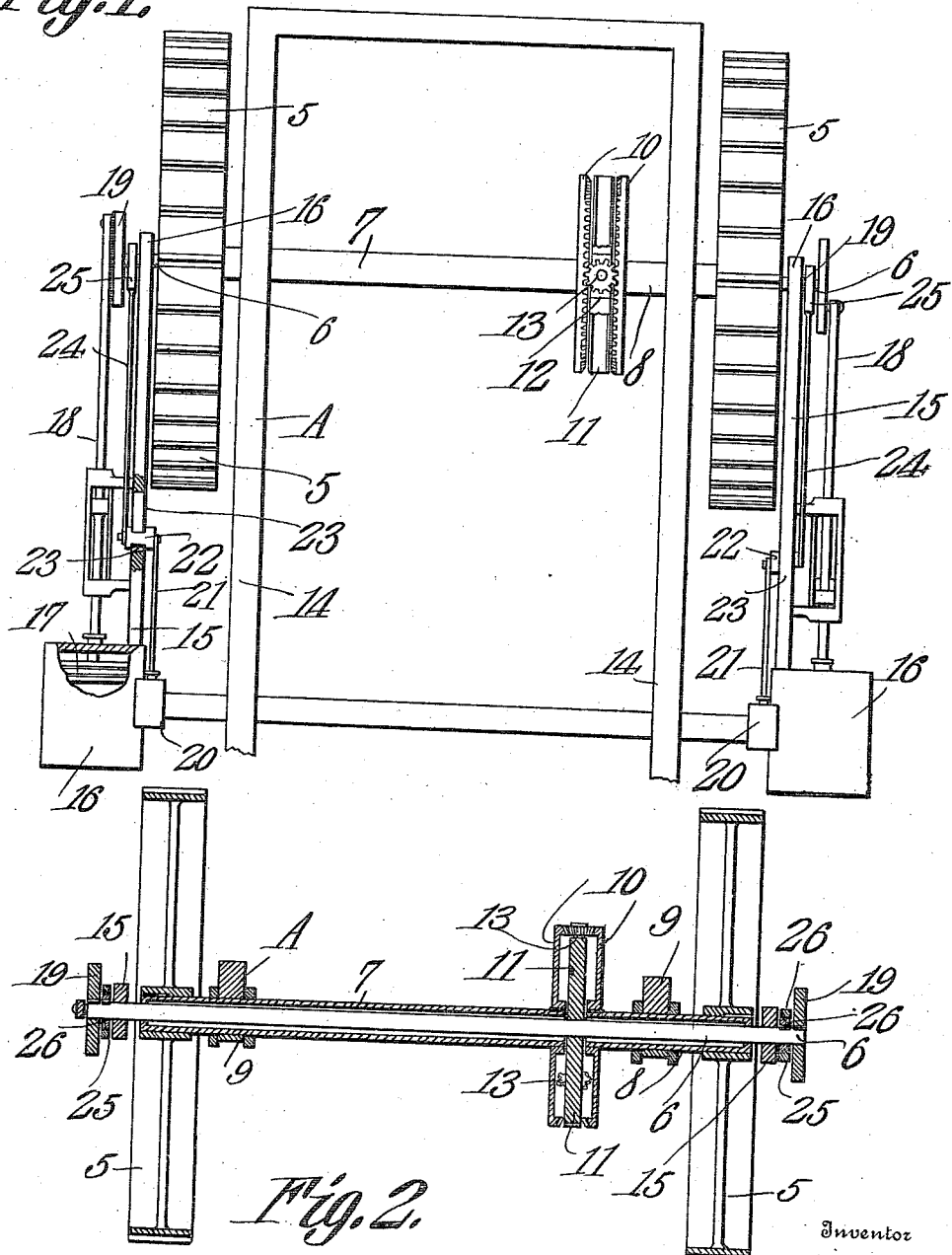

ASA B. HOWARD, OF WELLINGTON, KANSAS.

TRACTION-ENGINE.

985,897.   Specification of Letters Patent.   Patented Mar. 7, 1911.

Application filed March 22, 1909. Serial No. 484,983.

*To all whom it may concern:*

Be it known that I, ASA B. HOWARD, a citizen of the United States, residing at Wellington, in the county of Sumner and State of Kansas, have invented a new and useful Traction-Engine, of which the following is a specification.

It is the object of the present invention to provide an improved construction of drive mechanism for traction engines and particularly for those which are employed in drawing gang plows and similar agricultural implements.

The object aimed at is to provide, in drive mechanism of this class, such a construction and combination of parts as will permit of the traction engine being turned sharply around at the end of a field so that time will not be lost in backing the engine until the proper position has been secured for its return over the field.

The invention resides in the combination with the rear axle of an engine of this type, of motor means operatively connected at each end of the axle for driving the same, when the engine is in actual use, at a constant rate of speed, and compensating gearing which permits, of course, of rotation of the two ground wheels, supporting the rear axle, at different rates of speed.

In the accompanying drawings, Figure 1 is a top plan view of the drive mechanism embodying the invention, the frame being shown as mounted upon an ordinary frame such as is provided beneath traction engines of the class described, and, Fig. 2 is a vertical longitudinal sectional view through the mechanism taken in a line with the rear axle of the engine.

In the drawings, the under frame of the engine is indicated in general by the reference character A and the ground wheels supporting the rear axle of the engine are indicated by the reference numeral 5, the rear axle being indicated by the numeral 6 and being solid and continuous from end to end. The ground wheels 5 are secured, by keys or other suitable securing means, one at the outer end of a sleeve shaft 7 and the other at the outer end of a similar shaft 8, the axle or main shaft 6 extending through these two shafts 7 and 8 as clearly shown in Fig. 2 of the drawings. The sleeve shafts 7 and 8 are journaled in suitable bearings 9 upon the under frame A of the engine, and keyed or otherwise secured at the inner end of each sleeve shaft is a bevel gear 10, these gears being opposed as in the ordinary compensating gearing. A disk 11 is secured upon the shaft or axle 6 at a point between the inner ends of the sleeve shafts 7 and 8 and is provided in its periphery with the usual recesses 12 in which are journaled the bevel pinions 13 usually employed in compensating gearing, the pinions being in mesh with the gears 10. Inasmuch as the gearing is of the ordinary form, further description of the same is not thought to be necessary, it being only necessary to state that as usual, the gearing permits of rotation of either of the ground wheels 5 at a greater or less rate of speed than the other ground wheel.

The upper frame of the engine includes side sills 15 which at their rear ends are provided with bearings 16 in which are journaled the ends of the shaft or axle 6. At the forward end of each sill 15, there is supported a steam engine or motor embodying the usual cylinder 16 in which works the piston 17 which has connection by means of the pitman 18 with the wrist pin of a crank disk 19 carried at the corresponding end of the axle or shaft 6, it being understood that this axle or shaft 6 is rotated through the medium of the two engines 16. The engines also embody each, a chest 20 in which reciprocates the usual slide valve and the valve rod thereof is indicated by the numeral 21 and has connection with a slide block 22 mounted in suitable slides 23 upon the corresponding sill 15. Connected to each slide block 22, pivotally, is one end of an eccentric rod 24 which connects with an eccentric strap 25 encircling an eccentric disk 26 also secured upon the shaft or axle 6, it being understood that the slide valve of each engine 16 is in this manner actuated from the rear axle of the engine.

From the foregoing description of the invention, it will be readily understood that the axle 6, while it may be driven at a constant rate of speed, will not be placed under strain when the engine is turning a curve, inasmuch as the compensating gearing establishing connection between this axle and the sleeve shafts 7 and 8 permits of rotation of the ground wheels at different relative rates of speed.

It will be seen that this construction permits the use of two independent motors which though separately connected to the cranks at the ends of the integral axle 6, also have their valves moved by eccentrics adjacent their cranks with the result that their strokes must be maintained in the position to which they were initially set. If the power from these engines were directed to the sleeve shafts on the main wheels, even though the valves were moved thereby, it would often occur that the cranks would become alined and dead centers would result, but this could never happen with my construction.

What is claimed is:—

A traction engine comprising a frame, sills carried by the frame and having end portions beyond the sides of the frame, parallel therewith and spaced from the same, a shaft journaled in the sills and lying transversely of the frame, sleeves journaled upon the shaft and journaled in the opposite sides of the frame, a compensating gearing operatively connecting the shaft with the sleeves, traction wheels fixed to the outer ends of the sleeves and located in the spaces between the sides of the frame and the sills, cranks carried at the ends of the shaft beyond the outer sides of the sills, engines mounted upon the forward portions of the sills, means including cross heads for connecting the engines with one of said cranks, yokes carried by the sills and which slidably receive the cross heads, said engines having at their inner sides slide valves, said sills having guides, blocks slidably mounted in the said guides, means operatively connecting each block with one of the slide valves, eccentrics fixed to the shaft beyond the outer sides of the sills and means operatively connecting the eccentrics with the blocks.

In testimony that I claim the foregoing as my own, I have hereto affixed my signature in the presence of two witnesses.

ASA B. HOWARD.

Witnesses:
Wm. H. Burks,
B. E. Maxwell.

---

Copies of this patent may be obtained for five cents each, by addressing the "Commissioner of Patents, Washington, D. C."